United States Patent
Mayuzumi

(10) Patent No.: US 10,237,494 B2
(45) Date of Patent: Mar. 19, 2019

(54) DISPLAY CONTROL APPARATUS AND DISPLAY CONTROL METHOD

(71) Applicant: CANON KABUSHIKI KAISHA, Tokyo (JP)

(72) Inventor: Ichiko Mayuzumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/904,136

(22) Filed: Feb. 23, 2018

(65) Prior Publication Data

US 2018/0184011 A1 Jun. 28, 2018

Related U.S. Application Data

(63) Continuation of application No. 15/019,855, filed on Feb. 9, 2016, now Pat. No. 9,936,145.

(30) Foreign Application Priority Data

Feb. 12, 2015 (JP) .................................. 2015-025844

(51) Int. Cl.
   *H04N 5/247* (2006.01)
   *H04N 5/232* (2006.01)
   *H04N 7/18* (2006.01)

(52) U.S. Cl.
   CPC ......... *H04N 5/247* (2013.01); *H04N 5/23206* (2013.01); *H04N 5/23216* (2013.01); *H04N 7/181* (2013.01)

(58) Field of Classification Search
   CPC ............... H04N 5/247; H04N 5/23206; H04N 5/23216; H04N 7/181
   See application file for complete search history.

(56) References Cited

U.S. PATENT DOCUMENTS

| | | | | |
|---|---|---|---|---|
| 6,002,995 A | * | 12/1999 | Suzuki | ................. H04N 5/232 348/143 |
| 6,888,565 B1 | * | 5/2005 | Tanaka | ............... H04N 5/23203 348/207.1 |
| 9,936,145 B2 | * | 4/2018 | Mayuzumi | ......... H04N 5/23206 |

(Continued)

FOREIGN PATENT DOCUMENTS

| CN | 1722826 A | 1/2006 |
|---|---|---|
| CN | 103780872 A | 5/2014 |

(Continued)

*Primary Examiner* — Nhan T Tran
(74) *Attorney, Agent, or Firm* — Canon U.S.A., Inc. IP Division

(57) ABSTRACT

An image processing apparatus includes a display control unit configured to cause a display device to display a map image that indicates a layout of a plurality of cameras, an identification unit configured to identify one or a plurality of cameras that can capture an image of a designated region designated on the map image and can perform predetermined detection processing on the captured image, a processing unit configured to perform a display control for distinguishably indicating the one or plurality of cameras identified by the identification unit, among the plurality of cameras included in the map image, and a setting unit configured to make settings for causing at least one camera selected from the one or plurality of cameras identified by the identification unit to perform the predetermined detection processing.

18 Claims, 6 Drawing Sheets

(56) References Cited

U.S. PATENT DOCUMENTS

| | | | | |
|---|---|---|---|---|
| 2001/0024233 A1* | 9/2001 | Urisaka | ............ | H04N 5/232 |
| | | | | 348/211.6 |
| 2012/0206607 A1* | 8/2012 | Morioka | ............ | H04N 5/247 |
| | | | | 348/159 |
| 2013/0147961 A1* | 6/2013 | Gao | ............ | H04N 7/181 |
| | | | | 348/159 |
| 2016/0353064 A1* | 12/2016 | Aiura | ............ | G06K 9/00771 |

FOREIGN PATENT DOCUMENTS

| | | |
|---|---|---|
| JP | 2011154419 A | 8/2011 |
| JP | 2011233133 A | 11/2011 |
| JP | 2014179922 A | 9/2014 |

\* cited by examiner

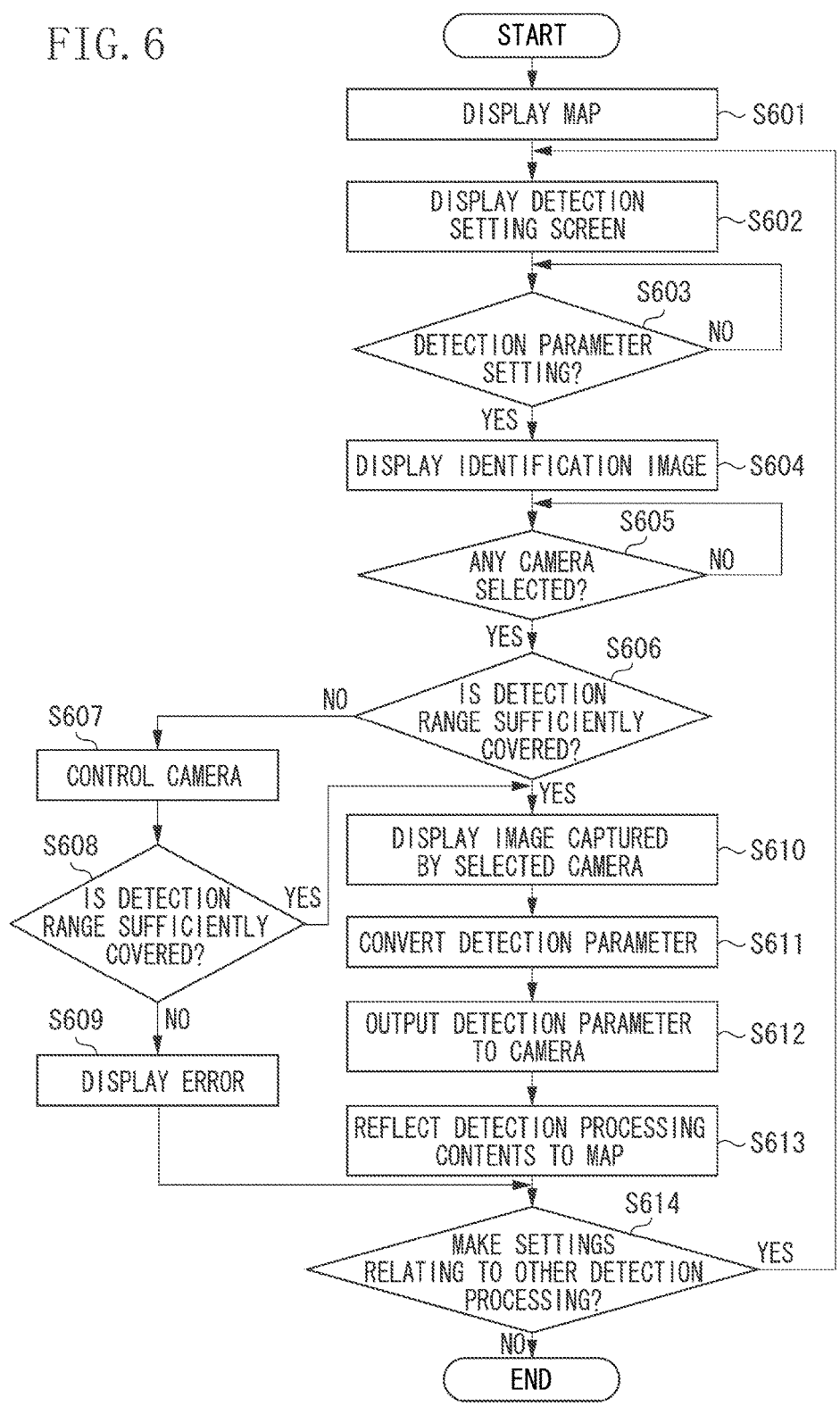

DISPLAY CONTROL APPARATUS AND DISPLAY CONTROL METHOD

CROSS-REFERENCE TO RELATED APPLICATIONS

This application is a continuation of U.S. patent application Ser. No. 15/019,855 filed Feb. 9, 2016, which claims the benefit of Japanese Patent Application No. 2015-025844 filed Feb. 12, 2015, all of which are hereby incorporated by reference herein in its entirety.

BACKGROUND

Field

The present description relates to a display control apparatus capable of displaying a map of a predetermined area.

Description of the Related Art

Capabilities of recent cameras are not limited to acquisition of videos and recording of video data. For example, there is a conventional camera capable of detecting and tracking a moving object based on image analysis and recognition techniques. Further, it is conventionally known to display a map indicating a layout of cameras.

As discussed in Japanese Patent No. 05238880, not only displaying a view field range of each camera on a map but also displaying a character string associated with the camera opposite the view field range is conventionally known.

However, there is a case where performing settings relating to the detection processing for a detection apparatus based on an operation applied to the map becomes difficult.

For example, if positional information on a map is not associated with positional information about an imaging region of a camera that is functionally operable as the detection apparatus, it is unable to set a detection processing range of the camera according to an operation performed on the map. Further, if detection processing currently performed by a camera displayed on the map cannot be identified, it is difficult to determine a camera to be used for new detection processing.

SUMMARY

In one aspect, an image processing apparatus includes a display control unit configured to cause a display device to display a map image that indicates a layout of a plurality of cameras, an identification unit configured to identify one or a plurality of cameras that can capture an image of a designated region designated on the map image and can perform predetermined detection processing on the captured image, a processing unit configured to perform a display control for distinguishably indicating the one or plurality of cameras identified by the identification unit, among the plurality of cameras included in the map image, and a setting unit configured to make settings for causing at least one camera selected from the one or plurality of cameras identified by the identification unit to perform the predetermined detection processing.

Further features of the aspects described herein will become apparent from the following description of exemplary embodiments with reference to the attached drawings.

BRIEF DESCRIPTION OF THE DRAWINGS

FIG. 6 is a flowchart illustrating an operation performed by the display control apparatus according to the exemplary embodiment.

DESCRIPTION OF THE EMBODIMENTS

Hereinafter, exemplary embodiments will be described in detail below with reference to attached drawings. Each configuration described below is a mere example and not all embodiments are limited to the illustrated configurations.

Figure 1:
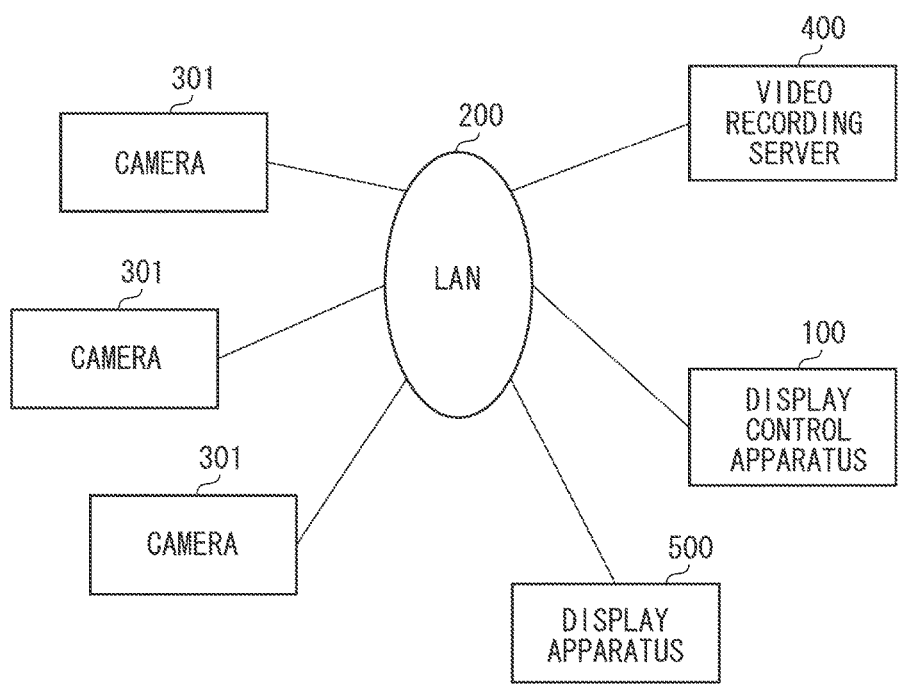
FIG. 1 is a diagram illustrating a system configuration according to an exemplary embodiment.

FIG. 1 illustrates an example of a system configuration of a camera system according to an exemplary embodiment. A display control apparatus 100 can display a map of a predetermined area on a display screen. The display control apparatus 100 according to the present exemplary embodiment is also functionally operable as a camera control apparatus that performs settings relating to detection processing, and pan, tilt, and zoom controls for a camera 301. The camera system illustrated in FIG. 1 includes a local area network (LAN) 200. However, the LAN 200 can be replaced by the Internet or any other appropriate network.

The camera (i.e., an image capturing apparatus) 301 is functionally operable as a detection apparatus that performs various detection processing. The camera 301 transmits a captured image to the display control apparatus 100 and a video recording server 400 via the LAN 200. Further, the camera 301 receives settings relating to detection processing from the display control apparatus 100 and performs detection processing. Although only three cameras 301 are illustrated in FIG. 1, the number of the cameras 301 is not limited to three. Further, in the present exemplary embodiment, a camera 301 (i.e., an image capturing apparatus) serves as the detection apparatus capable of performing the detection processing. However, the detection apparatus according to the present exemplary embodiment is not limited to a camera 301. For example, the detection apparatus may be a heat sensor, a sound sensor, a vibration sensor, an infrared sensor, or may be a multiple-function apparatus that has some of the functions of the above-mentioned sensors.

Further, when the camera 301 is installed, the camera 301 notifies the display control apparatus 100 of various camera parameters of the camera 301, including viewing angle, zoom setting, installation position, and installation angle. Then, the display control apparatus 100 generates association information that associates an arbitrary position (coordinate values) on the map with a corresponding position (coordinate values) on a captured image based on the above-mentioned camera parameters. Further, the display control apparatus 100 generates detection setting conversion information based on the association information. Although described in detail below, the detection setting conversion information is used to determine a detection parameter for the camera 301, with reference to a detection parameter (e.g., a detection range) for the detection processing having been set on the map. Further, details of the map will be described below with reference to FIG. 3.

The camera 301 according to the present exemplary embodiment holds its own viewing angle and zoom setting information. However, if the camera 301 is not configured to change a zoom magnification, it is unnecessary for the camera 301 to hold the zoom setting information. Further, the camera 301 can acquire information about its own installation position based on positional information from the Global Positioning System (GPS). Further, the camera 301 can acquire information about its own installation angle with a gyro sensor. However, the method for acquiring the information about the viewing angle, zoom setting, installation position, and installation angle of the camera 301 is not limited to the above-mentioned method. For example, a user or a contractor can individually input the above-mentioned information.

Further, in the present exemplary embodiment, the detection setting conversion information is stored in the display control apparatus 100. Alternatively, the detection setting conversion information may be stored in each camera 301 and may be provided to the display control apparatus 100 at required timing. Further, the detection setting conversion information is appropriately updated in response to a change of the zoom magnification or a change of the installation position of the camera 301. Further, the detection setting conversion information may be updated at predetermined intervals or may be updated when an update instruction is received from a user.

The video recording server 400 receives a captured image from the camera 301 and records the received image in a hard disk drive. A display apparatus 500 displays various images based on information received from the display control apparatus 100, the cameras 301, and the video recording server 400. The display control apparatus 100 may be integrated with the display apparatus 500.

Figure 2:
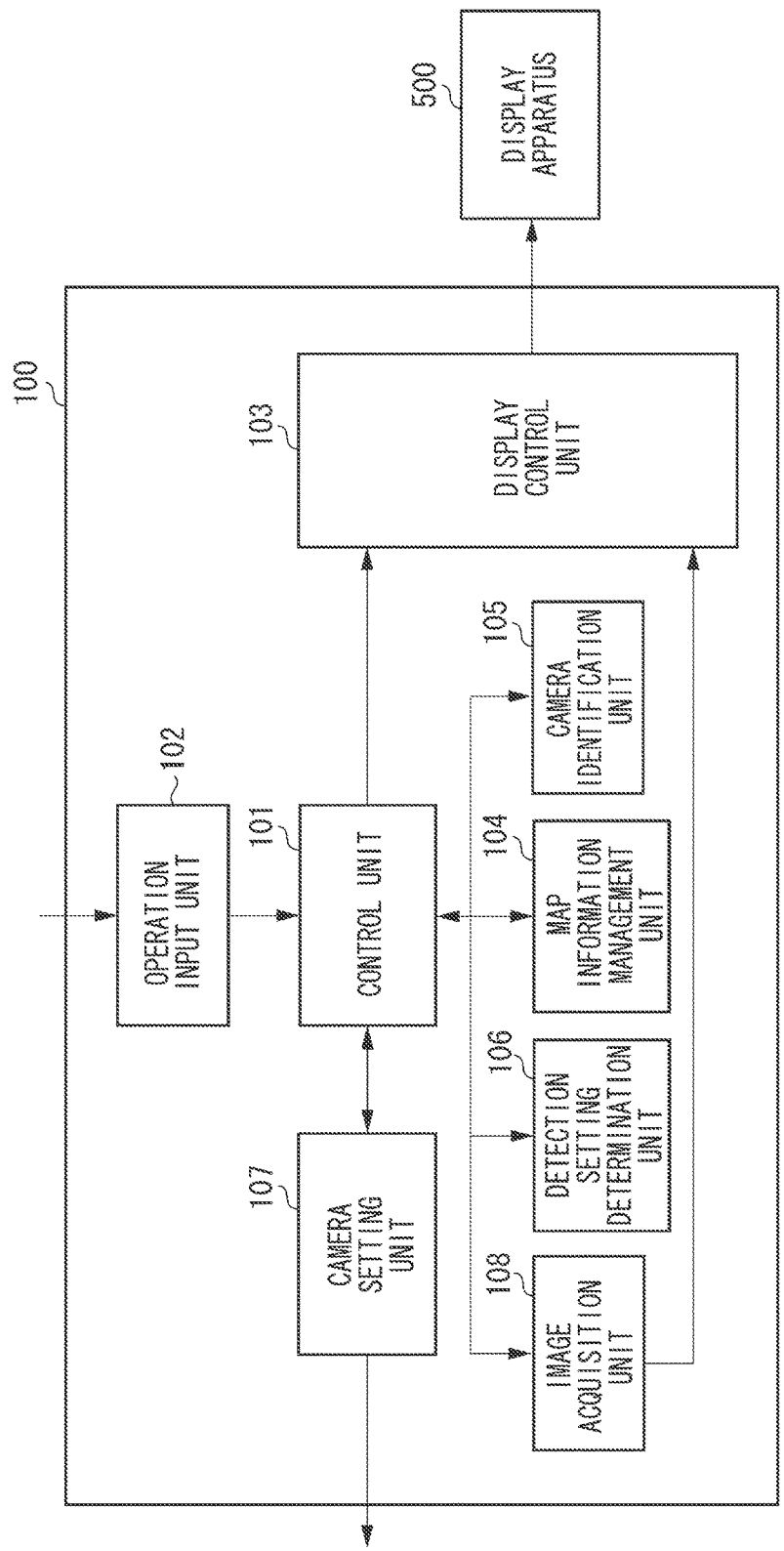
FIG. 2 is a block diagram illustrating a configuration of a display control apparatus according to the exemplary embodiment.

FIG. 2 is a block diagram illustrating a configuration of the display control apparatus 100 according to the present exemplary embodiment. The display control apparatus 100 illustrated in FIG. 2 includes a control unit 101 that controls each functional unit of the display control apparatus 100. More specifically, the control unit 101 causes a display control unit 103 to display a map on a display screen of the display apparatus 500 based on map information acquired from a map information management unit 104. Further, the control unit 101 acquires operation information corresponding to a user operation performed on the display screen on which the map is displayed, via an operation input unit 102. Further, the control unit 101 notifies a camera identification unit 105 of a detection parameter (e.g., a detection range) for detection processing identified by the operation information and causes the camera identification unit 105 to identify a camera 301 capable of performing the detection processing from among the cameras 301. Further, the control unit 101 causes the display control unit 103 to display an identification image that distinguishably indicates the camera 301 identified by the camera identification unit 105 on the display screen.

Further, the control unit 101 acquires operation information corresponding to a user operation performed on the display screen on which the identification image is displayed, via the operation input unit 102. Further, the control unit 101 notifies a detection setting determination unit 106 of identification information of the camera 301 identified based on the operation information acquired via the operation input unit 102 with the detection parameter. Then, the control unit 101 outputs a detection parameter determined by the detection setting determination unit 106 to the camera 301.

The operation input unit 102 is used for inputting operation information corresponding to a user operation. For example, a user can input the operation information to the display control apparatus 100 using a keyboard, a mouse, or a touch panel. The operation information input via the operation input unit 102 will be described in detail below.

The display control unit 103 controls the display screen of the display apparatus 500. The display control unit 103 is capable of displaying a map (i.e., a layout drawing) indicating the layout of cameras 301 in an area. Further, the display control unit 103 is also capable of displaying an identification image that distinguishably indicates a camera 301 capable of performing detection processing designated by a user and an image captured by the camera 301 identified based on a user operation, on the display screen. The display apparatus 500 may be integrated with the display control apparatus 100.

The map information management unit 104 manages map information required to display the map. More specifically, the map information managed by the map information management unit 104 includes area information indicating an area in which the camera system is present, and includes at least the information about viewing angle, zoom setting, installation position, and installation angle of each camera 301. The area information includes a spatial shape of the area, and position and shape information about a main object (e.g., a shelf, a column, or a desk) that is present in the area. The map information management unit 104 may acquire the area information by reading design data of the area or may acquire area information created by a user for the camera system. Further, the information about the viewing angle, zoom setting, installation position, and installation angle of each camera 301 is acquired, as the detection setting conversion information, from each camera 301.

Further, the map information management unit 104 according to the present exemplary embodiment manages the type of detection processing that the camera 301 is currently performing and range information about the range of the detection processing that the camera 301 is currently performing. The map information management unit 104 can generate a map that enables a user to recognize the type of the currently progressing detection processing and the range of the currently progressing detection processing. Further, the map information management unit 104 can cause the display control unit 103 to display the generated map on the display screen. An example of the map will be described in detail below with reference to FIG. 3.

The camera identification unit 105 identifies a camera 301 to be used for the detection processing from among the cameras 301. The camera identification unit 105 extracts the camera 301, which is appropriate to perform the detection processing determined by a user operation on the display screen that displays the map, from the plurality of cameras 301. Then, the camera identification unit 105 generates an identification image that distinguishably indicates the extracted camera 301 and causes the display control unit 103 to display the generated identification image on the display screen.

Then, the camera identification unit 105 identifies the camera 301 to be used for the detection processing according to a user operation performed on the display screen on which the identification image is displayed. The identification image to be displayed by the display control unit 103 may be a list image including the cameras 301 that can perform the detection processing or may be an emphasized image that emphasizes a camera symbol corresponding to the camera 301 that can perform the detection processing on the map that displays a plurality of camera symbols. The identification image is an image that enables a user to identify the camera 301 that can perform the detection processing.

The detection setting determination unit 106 determines a detection parameter for the camera 301 that performs the detection processing, based on the detection parameter (e.g., the detection range) determined by a user operation performed on the display screen on which the map is displayed. The detection setting determination unit 106 according to the present exemplary embodiment converts the detection parameter determined by the user operation into the detection parameter for the camera 301. The detection parameter determined in this case is, for example, region information indicating a region to which the detection processing (residence detection) is applied. The detection setting determination unit 106 according to the present exemplary embodiment converts the region designated on the map (e.g., the detection range) into range information corresponding to an imaging range of the camera 301 that performs the detection processing. The above-mentioned conversion is performed based on the detection setting conversion information. More specifically, the detection setting determination unit 106 converts the detection parameter designated on the map into the detection parameter of the camera 301 that performs the detection processing, based on the viewing angle, zoom setting, installation position, and installation angle of the camera 301. The detection parameter (e.g., the detection range) obtained through the above-mentioned conversion is the detection range on the imaging range of the camera 301.

The detection parameter is not limited to the detection range. For example, if the detection processing is passage detection processing, the detection parameter is coordinate information for identifying a detection line. The passage detection processing is detection processing for detecting an object that has passed through a predetermined position in a captured image. Another example of the detection processing is, for example, residence detection processing for detecting a predetermined object (e.g., a human) that is present in a predetermined region in an image captured by the camera for a predetermined time or more. Further, yet another example of the detection processing is congestion detection processing for detecting a predetermined number of objects or more that are present in a predetermined region in a captured image or entry detection processing for detecting a predetermined object that has entered a predetermined region in a captured image. The above-mentioned object may be a human body, a human face, a specific animal, or an automobile, which the user can arbitrarily set according to the purpose of using the camera system.

A camera setting unit 107 notifies the camera 301 of the detection setting determined by the detection setting determination unit 106 via the LAN 200 and performs settings for the detection processing.

An image acquisition unit 108 acquires an image captured by the camera 301 via the LAN 200. Further, the image acquisition unit 108 can acquire a captured image from the video recording server 400. The display control unit 103 can display the captured image acquired by the image acquisition unit 108 on the display screen of the display apparatus 500.

Figure 3:
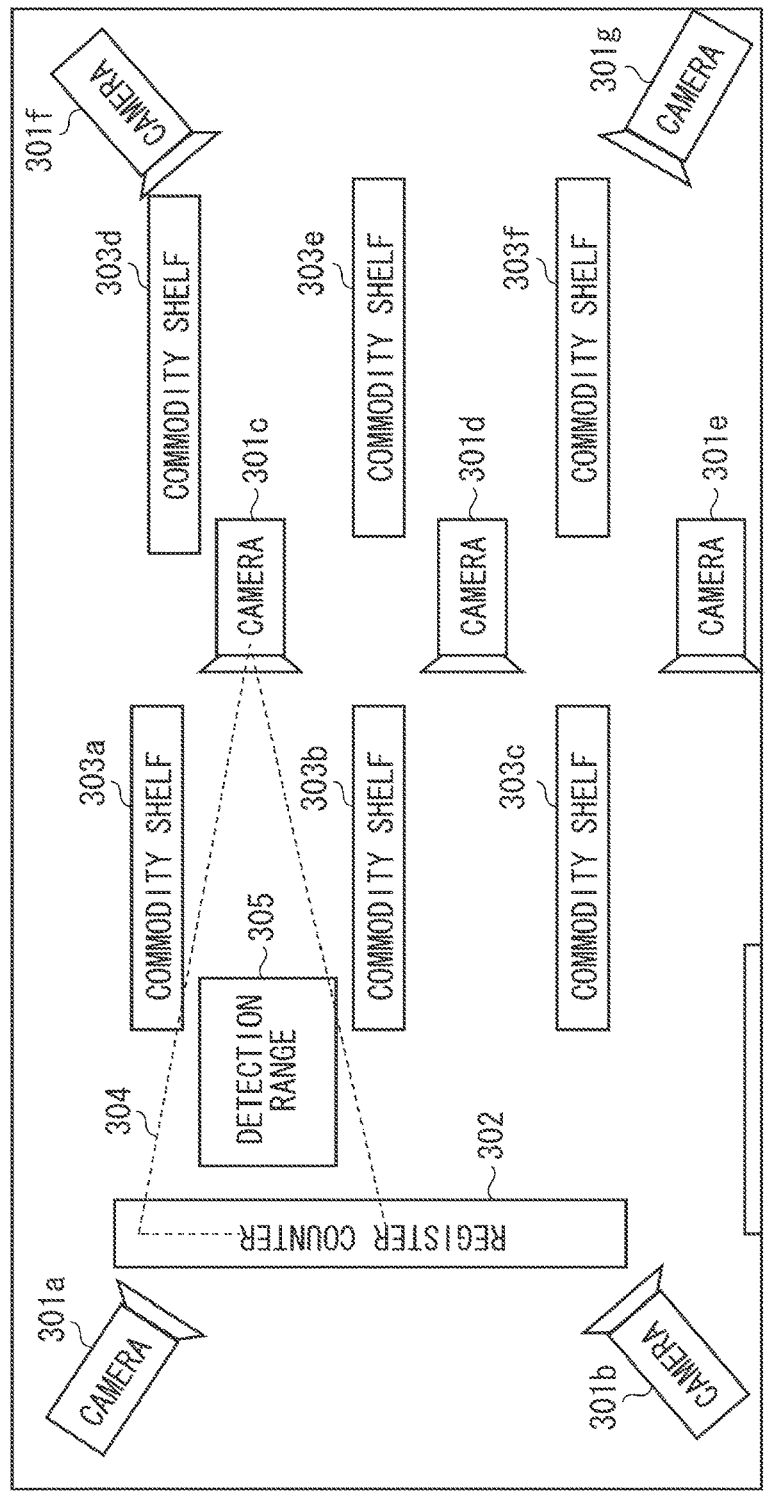
FIG. 3 illustrates an example of an in-store map.

FIG. 3 illustrates an example of the map. In the present exemplary embodiment, the map indicates the layout of cameras, a register counter, and commodity shelves located in a store. The map is generated based on the map information stored in the map information management unit 104, which includes the area information and the viewing angle, zoom setting, installation position, and installation direction of each camera 301. The display control unit 103 displays the generated map on the display screen of the display apparatus 500.

The map illustrated in FIG. 3 includes camera symbols (cameras) 301*a* to 301*g*. Each camera symbol indicates the installation position and installation direction of each camera 301 disposed in the store. Further, the map includes a register counter 302 and commodity shelves 303*a* to 303*f*.

A view field range 304 indicates the view field of the camera 301*c*. The map can indicate another view field range of a different camera. In the present exemplary embodiment, the map indicates only the view field range of the camera 301*c* for the purpose of illustration. A detection range 305 is a range in which the detection processing having been set by the user operation is performed.

The map information management unit 104 of the display control apparatus 100 holds the information about the viewing angle, zoom setting, installation position, and installation angle of each camera 301. The map information management unit 104 is capable of calculating the view field range based on the above-mentioned information. Further, the map information management unit 104 can generate a map including the view field range of each camera 301 based on the view field range of each camera 301.

Further, when the viewing angle of the camera 301 is set, the display control apparatus 100 can associate an arbitrary position (coordinate values) on the map with a corresponding position (coordinate values) on an image captured by each camera 301. For example, an association method can include performing a marking on a floor and associating coordinate values of the map with coordinate values of the image captured by the camera 301 with reference to marking positions included in the image captured by the camera 301.

More specifically, the association method includes marking four points on the floor. Two points of the marked four points are points (identification points) that have positions that can be identified on the map, such as corners of a room. The association method further includes actually measuring the distance between an identification point that has a position that can be identified on the map and a non-identified point that has a position that cannot be identified on the map. It is assumed that a scale size of the map is known beforehand. The display control apparatus 100 determines the position of each non-identified point on the map based on the actually measured values and the scale size of the map. Further, the display control apparatus 100 associates the four points, including the identification points and the non-identified points, on the map with four points that are present in a captured image. The display control apparatus 100 can associate an arbitrary position on the map with a corresponding position in the captured image by applying projection conversion and reverse conversion thereof to the associated positions. The control unit 101 holds the association information obtained as mentioned above as the detection setting conversion information.

In the present exemplary embodiment, it is possible to associate an arbitrary position on the map with a corresponding position in the captured image by using the position of a non-movable object, such as a corner of a room, an edge of a commodity shelf, or a position of a column, provided in the illustrated store, as a marking point of the identification point. However, the method for associating the position on the map with the corresponding position in the captured image is not limited to the above-mentioned method.

The detection setting determination unit 106 according to the present exemplary embodiment holds the detection setting conversion information having been obtained as mentioned above. The display control apparatus 100 according to the present exemplary embodiment can simultaneously set the detection range set on the map and a height of a detection setting line. In the present exemplary embodiment, a default value of the height is, for example, 80 cm. The detection setting determination unit 106 changes the detection setting conversion information having been obtained as mentioned above while taking the height from the floor into consideration and holds the changed detection setting conversion information.

Figure 5:
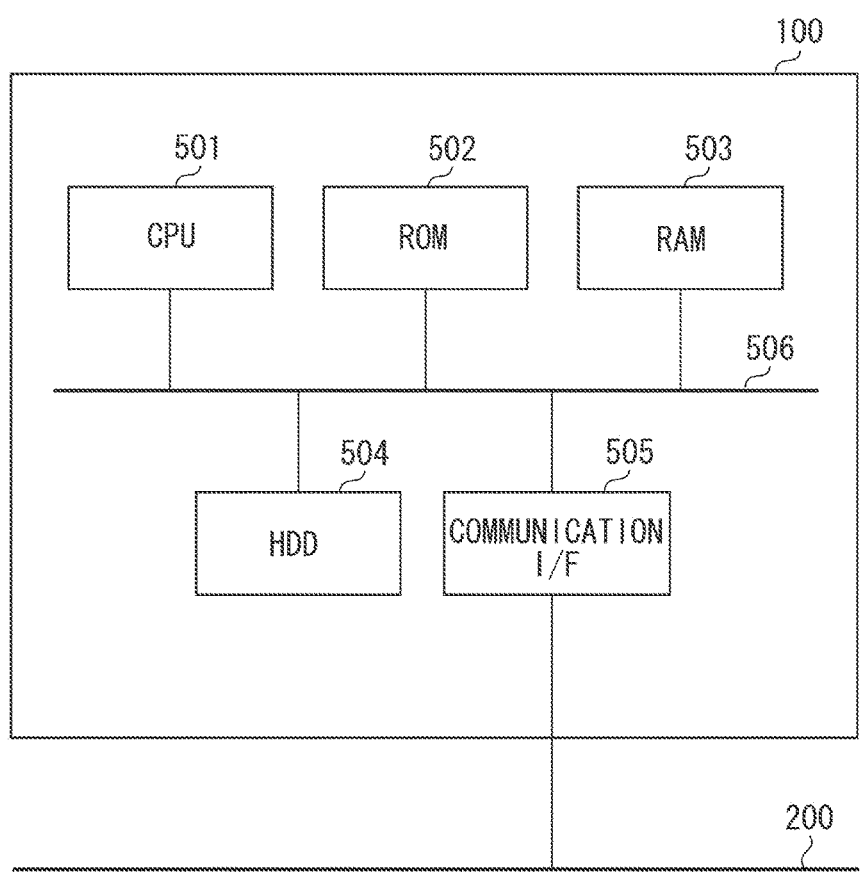
FIG. 5 illustrates an example of a hardware configuration of the display control apparatus according to the exemplary embodiment.

FIG. 5 illustrates an example of a hardware configuration of the display control apparatus 100. The display control apparatus 100 includes a central processing unit (CPU) 501, a read only memory (ROM) 502, a random access memory (RAM) 503, an external memory (HDD) 504, a communication I/F 505, and a system bus 506.

The CPU 501 controls various operations performed by the display control apparatus 100. More specifically, the CPU 501 controls the constituent components 502 to 505 via the system bus 506. The ROM 502 is a nonvolatile memory that stores control programs required when the CPU 501 performs various processing. The control programs may be also stored in the external memory 504 or an attachable and detachable storage medium.

The RAM 503 is functionally operable as a main memory or a work area for the CPU 501. More specifically, various functional operations are realized by the CPU 501 loading a program required to perform the processing into the RAM 503 from the ROM 502 and executing the loaded program.

The external memory 504 stores, for example, various data and information that are required when the CPU 501 performs processing based on the program. Further, for example, the external memory 504 stores various data and information obtained when the CPU 501 performs the processing based on the program.

The communication I/F 505 is an interface that communicates with an external apparatus (e.g., the camera 301 or the display apparatus 500). However, the display apparatus 500 may be integrated with the display control apparatus 100. The communication I/F 505 is, for example, a LAN interface. The system bus 506 connects the CPU 501, the ROM 502, the RAM 503, the external memory 504, and the communication I/F 505 to enable them to communicate with each other.

Next, an operational flow performed by the display control apparatus 100 according to the present exemplary embodiment will be described below with reference to a flowchart illustrated in FIG. 6. The processing illustrated in FIG. 6 is realized by the CPU 501 of the display control apparatus 100 according to the present exemplary embodiment, reading and executing a predetermined program. However, the processing of the flowchart illustrated in FIG. 6 may be realized partly or entirely by dedicated hardware. Further, the CPU 501 starts the processing of the flowchart illustrated in FIG. 6 in response to an instruction input by a user to start to make the settings related to the detection processing. However, the start timing of the processing illustrated in FIG. 6 is not limited to the above-mentioned timing.

In step S601, the map information management unit 104 generates a map (layout drawing) based on the above-mentioned map information and causes the display control unit 103 to display the generated map on the display screen of the display apparatus 500. The map information includes the area information, such as the spatial shape of a predetermined area, in which the camera system is present, and the position and shape of the main object. The map information further includes the information about the viewing angle, zoom setting, installation position, and installation angle of each camera 301. The map generated by the map information management unit 104 is an image indicating the layout of the cameras 301 located in the predetermined area.

In step S602, the display control unit 103 displays a detection setting screen. The detection setting screen is usable to make detection settings for the camera 301. Using the detection setting screen is useful to set the type of the detection processing to be performed by the camera 301, the range of the detection processing, and a threshold value relating to the detection setting, if necessary. The detection setting screen can be generated by the map information management unit 104.

In the present exemplary embodiment, the detection processing includes the residence detection processing, congestion detection processing, congestion level detection processing, passage detection processing, and entry detection processing. The residence detection processing is detection processing for detecting an object that is present in a predetermined region in an image captured by the camera 301 for a predetermined time or more. The congestion detection processing is detection processing for detecting a predetermined number of objects or more that are present in a predetermined region in a captured image. The congestion level detection processing is detection processing for counting the number of objects that are present in a predetermined region in a captured image. The passage detection processing is detection processing for detecting an object that has passed through a predetermined position (e.g., the detection line) in a captured image. The entry detection processing is detection processing for detecting an object that has entered a predetermined region in a captured image.

However, the detection processing according to the present exemplary embodiment is not limited to the above-mentioned examples. Further, the above-mentioned predetermined region is a part or the whole of the captured image. Further, the above-mentioned object may be a human body, a human face, a specific animal, or an automobile, which the user can arbitrarily set according to the purpose of using the camera system.

In step S603, the control unit 101 determines whether a user operation has been performed on the display screen, on which the map is displayed, to identify the parameter of the detection processing. If the control unit 101 determines that the user operation has not been performed (NO in step S603), the control unit 101 waits for a predetermined time until the user operation is performed.

In the present exemplary embodiment, it is assumed that the residence detection processing is designated by the user and a target range of the residence detection processing designated by the user is specified as the detection range 305 illustrated in FIG. 3. In this case, the control unit 101 determines that the user operation has been performed (YES in step S603). Then, the operation proceeds to step S604.

In step S604, the camera identification unit 105 extracts a camera 301 that can perform the detection processing based on the detection region on the map identified by the user operation and respective imaging ranges of the cameras 301. Then, the display control unit 103 displays an identification image that identifies the camera 301 extracted by the camera identification unit 105 on the display screen.

According to the example illustrated in FIG. 3, the detection range 305 designated by the user is included in both the view field of the camera 301c and the view field of the camera 301a. Further, there is not any other camera 301 that can entirely cover the detection range 305. Therefore, the camera identification unit 105 generates an identification image to identify the camera 301a and the camera 301c (i.e., two of the plurality of cameras 301a to 301g) as candidates for the camera 301 that performs the detection processing.

If there is not any camera 301 that can cover the detection range 305 designated by the user, then in step S604, the display control unit 103 displays an image indicating that there is not any camera 301 that can perform the detection processing on the display screen.

Further, the identification image may be a list image including cameras 301 that can perform the detection processing or may be an emphasized image that emphasizes, among camera symbols displayed on the map, the camera symbol corresponding to the camera 301 that can perform the detection processing. The identification image enables the user to identify each camera that can perform the detection processing.

Further, the camera identification unit 105 can extract a camera 301 that can capture an image of the detection processing range (detection range 305) if an appropriate imaging range control (e.g., pan, tilt, or zoom control) is performed, from the cameras 301. More specifically, the camera identification unit 105 can extract a camera 301 that can perform the detection processing with reference to respective imaging ranges of the cameras 301. Further, the camera identification unit 105 can display an identification image that enables the user to identify each camera 301 capable of imaging the detection processing range without changing the imaging range and each camera 301 capable of imaging the detection processing range if the imaging range is changed.

Further, the camera identification unit 105 may be configured to extract a camera 301 that cannot capture an image of the detection processing range even if the imaging range is changed, from the cameras 301. In this case, the camera identification unit 105 displays an identification image that enables the user to identify each camera 301 capable of imaging the detection processing range without changing the imaging range, each camera 301 capable of imaging the detection processing range if the imaging range is changed, and each camera 301 incapable of imaging the detection processing range even if the imaging range is changed.

Figure 4:
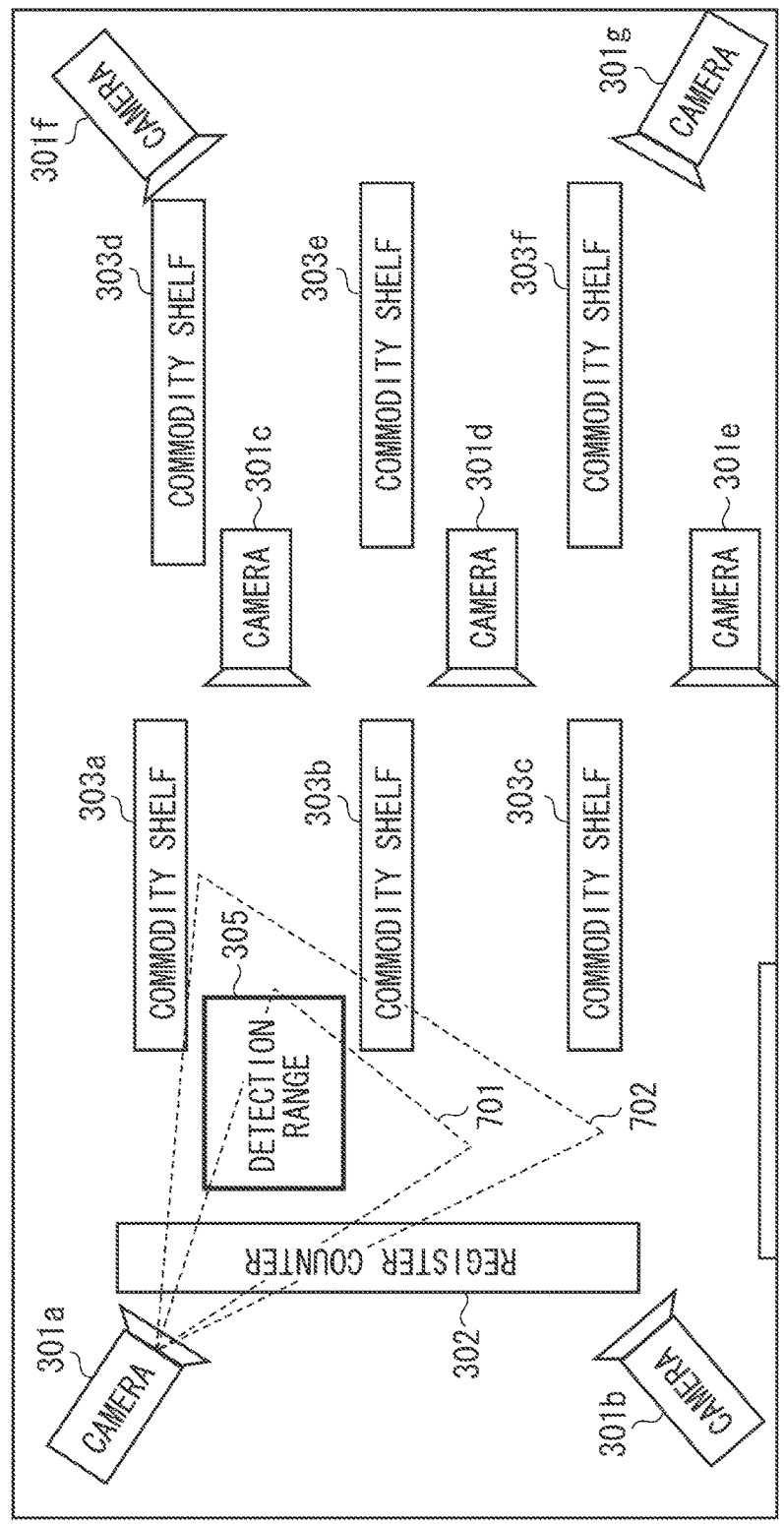
FIG. 4 illustrates another example of the in-store map.

An example of the camera 301 that can capture an image of the detection processing range if the imaging range is changed, among the cameras 301, will be described below with reference to FIG. 4. FIG. 4 illustrates a view field range 701 of the camera 301a in a state where the imaging range is not yet changed, in comparison with a view field range 702 obtainable if the imaging range is changed. As illustrated in FIG. 4, the present view field range 701 of the camera 301a cannot entirely cover the detection range 305. On the other hand, the widened view field range 702 can entirely cover the detection range 305. The above-mentioned configuration enables a user of the camera system to determine an optimum camera 301 to be used in the detection processing more appropriately.

Further, the camera identification unit 105 may be configured to distinguishably display a specific camera 301 that can capture a higher-resolution image of the detection processing range differently from other cameras 301 capable of imaging the detection processing range. Such a configuration is useful in preferentially causing the camera 301 capable of performing detection processing with higher accuracy to perform the detection processing.

Further, the camera identification unit 105 can extract a camera 301 that is more suitable the detection processing from the cameras 301 capable of imaging the detection processing range, with reference to a direction relating to the detection processing. For example, in a case where the detection processing is the passage detection processing, it is considered that the accuracy of the passage detection increases in many cases if an imaging direction and a passage direction are in a perpendicular relationship although it is dependent on the height of the detection line and the installation height of the camera 301. Thus, if there is a plurality of cameras 301 capable of imaging the detection processing range, the camera identification unit 105 can display a camera 301, the imaging direction of which is perpendicular to a detection direction, discriminately from other cameras 301. The above-mentioned configuration is useful in preferentially causing the camera 301 capable of performing detection processing with higher accuracy to perform the detection processing.

In step S605, the control unit 101 determines whether a user operation for identifying a camera 301 is performed by the user on the display screen on which the identification image is displayed. The user can select one or a plurality of cameras 301 to be used for the detection processing. If the control unit 101 determines that the user operation for identifying the camera 301 has not been performed (NO in step S605), the control unit 101 waits for a predetermined time until the user operation is performed.

In step S606, the camera setting unit 107 determines whether the camera 301 selected by the user in step S605 sufficiently covers the detection processing range. For example, in a case where the camera 301 selected by the user can capture an image of the detection processing range if the imaging range is changed, the camera setting unit 107 determines that the selected camera 301 does not sufficiently cover the detection processing range. Further, even in a case where the imaging range of the camera 301 already covers the entire detection processing range, the camera setting unit 107 may determine that the selected camera 301 does not sufficiently cover the detection processing range depending on the type of the detection processing. For example, detecting the passage may be difficult if the detection line is present on an edge of the imaging range of the camera, because it is necessary to identify a pre-passage position of a target object and a post-passage position of the object when the detection processing type is the passage detection processing.

Further, even in a case where the imaging range of the camera 301 already covers the entire detection processing range designated on the map, the camera setting unit 107 may determine that the selected camera 301 does not sufficiently cover the detection processing range depending on the height having been set as a parameter of the detection processing. For example, if the designated position of the detection processing is higher than an ordinary position, a spatial region corresponding to the designated higher position may not be included in the imaging range even in a case where the imaging range of the camera 301 covers the detection processing range designated on the map.

The camera setting unit 107 according to the present exemplary embodiment converts the detection processing range designated on the map into a wider range when a difference between the height designated as the parameter for the detection processing and the default height (80 cm) is large. Then, the camera setting unit 107 determines whether the imaging range of the camera 301 covers the converted detection processing range. In step S606, if the camera setting unit 107 determines that the selected camera 301 sufficiently covers the detection processing range (YES in step S606), the operation proceeds to step S610. If the camera setting unit 107 determines that the selected camera 301 does not sufficiently cover the detection processing range (NO in step S606), the operation proceeds to step S607.

In step S607, the camera setting unit 107 changes the imaging range of the camera 301 by performing at least one of the pan, tilt, and zoom controls. For example, in a case where the detection line for the passage detection processing is present on an edge of the imaging range of the camera 301, the camera setting unit 107 moves the position of the detection line toward the center of the imaging range by performing the pan and tilt controls for the camera 301. Further, for example, if the height having been set as the parameter for the detection processing is greater than the default value, the camera setting unit 107 decreases the zoom magnification in such a way as to widen the imaging range of the camera 301.

In step S608, the camera setting unit 107 determines whether the imaging range of the camera 301 sufficiently covers the detection processing range having been changed through the control performed in step S607. The determination processing performed in step S608 is similar to the determination processing performed in step S606. If the camera setting unit 107 determines that the imaging range of the camera does not sufficiently cover the detection processing range even after controlling the imaging direction of the camera (NO in step S608), the operation proceeds to step S609. Then in step S609, the display control unit 103 displays an error message or indication. Generating warning sound may be effective instead of performing the above-mentioned error display. The processing in steps S606 to S609 is optional and not essentially required.

In step S610, the image acquisition unit 108 acquires an image captured by the camera 301 identified according to the user operation received in step S605 (e.g., the camera 301c identified in the present exemplary embodiment) and has the captured image displayed on the display screen. Further, the camera identification unit 105 causes the display control unit 103 to display a setting screen for making settings relating to detection processing for the identified camera 301 on the display screen. In this way, the user can confirm results of the detection processing performed on the captured image.

In step S611, the detection setting determination unit 106 determines a detection parameter (e.g., a detection range 305) corresponding to the imaging range of the camera 301c with reference to the detection parameter (e.g., the detection range 305) designated by the user in step S601. As mentioned above, the display control apparatus 100 acquires association information that associates a position (coordinate values) on the map with a position (coordinate values) in an image captured by each camera 301 and holds detection setting conversion information obtainable based on the association information. The detection setting determination unit 106 can convert a detection parameter with reference to the detection setting conversion information. Alternatively, the detection setting determination unit 106 can determine a converted detection parameter by converting a detection parameter having been set on the map based on the association information.

In step S612, the camera setting unit 107 outputs the detection parameter determined by the detection setting determination unit 106 to the camera 301 identified according to the user operation received in step S605. The detection parameters include the type of detection processing and information relating to the detection processing range (e.g., detection region in the case of residence detection processing and information identifying detection line in the case of passage detection processing). Further, the detection parameters include information relating to threshold value for the detection processing (e.g., time to be referred to in residence determination in the case of residence detection processing, and information indicating passage direction of the detection line in the case of passage detection processing), type of detection target object, and information indicating the height of the detection region.

The detection setting determination unit 106 converts each one of the above-mentioned plurality of detection parameters if conversion is required. It is unnecessary that the detection parameter to be output in step S612 includes all of the above-mentioned detection parameters. The camera setting unit 107 outputs a part or the whole of the above-mentioned detection parameters to the camera 301 according to the type of detection processing or a user instruction. Alternatively, the camera 301 can be configured to read the detection parameter from the display control apparatus 100. Further, for example, the user may manually set a detection parameter displayed by the display control apparatus 100 to the camera 301.

Further, in step S612, the display control unit 103 displays the image captured by the camera 301 together with the detection processing results on the display screen. The user can confirm settings relating to the detection processing and accuracy of the detection processing by viewing the captured image and detection processing results displayed on the display screen. Further, the user can correct the settings relating to the detection processing if necessary. If the user corrects the settings, the camera setting unit 107 outputs a detection parameter reflecting the correction to the camera 301.

In step S613, the display control unit 103 reflects the detection processing contents having been set for the camera 301 to the map. The detection processing contents include the type of detection processing, range of detection processing, and camera 301 that is currently performing the detection processing. For example, the display control unit 103 displays a map including a camera symbol corresponding to the camera 301 that is currently performing the detection processing, which is differently colored compared to camera symbols corresponding to other cameras 301. Further, for example, the display control unit 103 distinguishably displays a map including a plurality of detection ranges, in which a detection range dedicated to the residence detection processing is colored differently from a detection range dedicated to the congestion detection processing.

However, it is unnecessary to distinguishably display all of the detection processing type, detection processing range, and camera 301 that is currently performing detection processing. It is useful to reflect necessary contents to the map according to user settings or the purpose of using the system. Further, it is useful to reflect information relating to other detection processing to the map. Displaying the information about the detection processing having been set on the map as mentioned above enables the user to determine more easily the detection processing newly performed, the range of the newly performed detection processing, and the camera to be used for the detection processing.

In step S614, the display control unit 103 displays an image that inquires whether the user makes settings relating to other detection processing on the display screen. If it is determined that the user makes the settings relating to other detection processing (YES in step S614), the operation returns to step S602. If it is determined that the user does not make the settings relating to other detection processing (NO in step S614), the display control apparatus 100 terminates the processing of the flowchart illustrated in FIG. 6.

As described above, the display control apparatus 100 according to the present exemplary embodiment holds the association information that associates an arbitrary position (coordinate values) in the imaging range of the camera 301 with a corresponding position (coordinate values) on the map. The display control apparatus 100 converts a detection parameter for the detection processing designated on the map based on the association information and provides the converted parameter to the camera 301. Making settings for map-based camera detection processing can be easily realized by the above-mentioned configuration.

Further, the display control apparatus 100 according to the present exemplary embodiment displays a map that can discriminate detection processing contents (e.g., type of the detection processing, range of the detection processing, and camera that is currently performing the detection processing) having been already set. The above-mentioned configuration is useful in that a user can easily determine the type and range of detection processing to be performed as well as a camera to be used in the detection processing.

In the above-mentioned exemplary embodiment, a camera (i.e., the image capturing apparatus) performs the detection processing. However, the detection apparatus performing the detection processing is not limited to a camera. Examples of the detection apparatus include a heat sensor (or a heat sensing device), an infrared camera (or an infrared image capturing apparatus), a vibration sensor (or a vibration sensing apparatus), or a sound sensor (or a sound sensing apparatus). Further, a single apparatus may be configured to include the above-mentioned plurality of functions.

According to the present exemplary embodiment, settings relating to the detection processing for a detection apparatus can be easily made based on an operation performed on a map.

Other Embodiments

Other embodiment(s) can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the scope of the claims is not limited to the disclosed exemplary embodiments. Instead, the scope of the following claims encompasses all applicable modifications and equivalent structures and functions.

What is claimed is:

1. An image processing apparatus comprising:
one or more hardware processor; and
one or more memory for storing instructions to be executed by the one or more hardware processor,
wherein, when the instructions stored in the one or more memory are executed by the one or more hardware processor, the image processing apparatus functions as:
a display control unit configured to cause a display device to display a map image that indicates a layout of a plurality of cameras;
an acquiring unit configured to acquire operation information including designation of an area as a designated area for detection processing and designation of a type of the detection processing to be performed by at least one of the plurality of cameras, wherein the designated area is designated on the map image by a user;
an identification unit configured to identify one or more cameras that are capable of capturing an image corresponding to the designated area on the map image and performing the detection processing on an area corresponding to the designated area of the captured image according to the designated type; and
a processing unit configured to cause the display device to display identification information indicating the one or more cameras identified by the identification unit, among the plurality of cameras included in the map image.

2. The image processing apparatus according to claim 1, wherein the identification unit identifies the one or more cameras that are capable of detecting passage and imaging in a direction perpendicular to a direction of the passage.

3. The image processing apparatus according to claim 1, wherein the identification unit identifies the one or more cameras that are capable of capturing the image corresponding to the designated area on the map image, based on at least one of installation position, installation direction, and viewing angle of each of the plurality of cameras on the map image.

4. The image processing apparatus according to claim 1, wherein the processing unit causes the display device to display an identification image that enables a user to identify the one or more cameras identified by the identification unit among the plurality of cameras, and
wherein the camera to be used for the predetermined detection processing is determined according to an operation performed on the display device that displays the identification image.

5. The image processing apparatus according to claim 4, wherein the identification unit further identifies one or more cameras that can capture an image of the designated area and perform predetermined detection processing on the designated area if an imaging range is changed, among the plurality of cameras, and
wherein the processing unit causes the display device to display an identification image that enables a user to identify a camera that can capture an image of the designated area if the imaging range is changed and can perform the predetermined detection processing on the captured image.

6. The image processing apparatus according to claim 4, wherein the identification unit identifies one or more cameras that cannot capture an image of the designated area even if an imaging range is changed, among the plurality of cameras, and wherein the processing unit causes the display device to display an identification image that enables the user to identify a camera that can capture an image of the designated area without changing the imaging range, a camera that can capture an image of the designated area if the imaging range is changed, and a camera that cannot capture an image of the designated area even if the imaging range is changed, among the plurality of cameras.

7. The image processing apparatus according to claim 1, further comprising:

an image acquisition unit configured to acquire a captured image from at least one camera selected from the one or more cameras identified by the identification unit; and a changing unit configured to change a detection parameter for the predetermined detection processing according to a user operation performed on the display device that displays the captured image acquired by the image acquisition unit.

8. The image processing apparatus according to claim 1, wherein the map image displayed by the processing unit includes a camera that is currently performing the predetermined detection processing, type of the predetermined detection processing, and target range of the predetermined detection processing.

9. The image processing apparatus according to claim 1, further comprising an information acquisition unit configured to acquire association information that associates a position on the map image with a corresponding position in an image captured by the camera, wherein the identification unit identifies the one or more cameras that can capture the image of the designated area, among the plurality of cameras, with reference to the association information acquired by the information acquisition unit.

10. The image processing apparatus according to claim 1, wherein the predetermined detection processing is at least one of residence detection processing for detecting an object that is present in a predetermined area in an image captured by the camera for a predetermined time or more, congestion detection processing for detecting a predetermined number of objects or more that are present in a predetermined area in a captured image, passage detection processing for detecting an object that has passed through a predetermined position in a captured image, and entry detection processing for detecting an object that has entered a predetermined area in a captured image.

11. The image processing apparatus according to claim 10, wherein the object is at least one of a human body, a human face, an automobile, and an animal.

12. The image processing apparatus according to claim 1, wherein a detection line usable in passage detection processing is included in the designated area.

13. The image processing apparatus according to claim 1, wherein the camera is at least one of an image capturing apparatus that performs an image capturing operation with visible light and an image capturing apparatus that performs an image capturing operation with invisible light.

14. An image processing method comprising:

causing a display device to display a map image that indicates a layout of a plurality of cameras;

acquiring operation information including designation of an area as a designated area for detection processing and designation of a type of the detection processing to be performed by at least one of the plurality of cameras, wherein the designated area is designated on the map image by a user;

identifying one or more cameras that are capable of capturing an image corresponding to the designated area on the map image and performing the detection processing on an area corresponding to the designated area of the captured image according to the designated type; and performing a display device for displaying identification information distinguishably indicating the identified one or more cameras, among the plurality of cameras included in the map image.

15. The image processing method according to claim 14, wherein the one or more cameras that are capable of detecting passage and imaging in a direction perpendicular to a direction of the passage.

16. The image processing method according to claim 14, wherein the one or more cameras that are capable of capturing the image corresponding to the designated area on the map image are identified based on at least one of installation position, installation direction, and viewing angle of each of the plurality of cameras on the map image.

17. The image processing method according to claim 14, wherein an identification image that enables a user to identify the one or more cameras identified among the plurality of cameras is displayed on the display device, and wherein the camera to be used for the predetermined detection processing is determined according to an operation performed on the display device that displays the identification image.

18. A non-transitory computer readable storage medium storing a program that causes a computer to perform an image processing method, the method comprising:

causing a display device to display a map image that indicates a layout of a plurality of cameras;

acquiring operation information including designation of an area as a designated area for detection processing and designation of a type of the detection processing to be performed by at least one of the plurality of cameras, wherein the designated area is on the map image by a user;

identifying one or more cameras that are capable of capturing an image corresponding to the designated area on the map image and performing the detection processing on an area corresponding to the designated area of the captured image according to the designated type; and performing a display device for displaying identification information distinguishably indicating the identified one or more cameras, among the plurality of cameras included in the map image.

* * * * *